US012490839B2

(12) United States Patent
Chen et al.

(10) Patent No.: US 12,490,839 B2
(45) Date of Patent: Dec. 9, 2025

(54) MATTRESS CLEANING MACHINE

(71) Applicant: Jiangsu Sea-lion Machinery Co., Ltd., Zhangjiagang (CN)

(72) Inventors: Hong Chen, Zhangjiagang (CN); Shengang Cai, Zhangjiagang (CN); Yexin Li, Zhangjiagang (CN); Lunan Wang, Zhangjiagang (CN); Qiaoyun Xiang, Zhangjiagang (CN)

(73) Assignee: Jiangsu Sea-Lion Machinery Co., Ltd., Zhangjiagang (CN)

( * ) Notice: Subject to any disclaimer, the term of this patent is extended or adjusted under 35 U.S.C. 154(b) by 438 days.

(21) Appl. No.: 18/194,848

(22) Filed: Apr. 3, 2023

(65) Prior Publication Data

US 2024/0277157 A1 Aug. 22, 2024

(30) Foreign Application Priority Data

Feb. 22, 2023 (CN) ......................... 202310150343.5

(51) Int. Cl.
*A47C 31/00* (2006.01)
*B08B 13/00* (2006.01)

(52) U.S. Cl.
CPC ............ *A47C 31/007* (2013.01); *B08B 13/00* (2013.01)

(58) Field of Classification Search
CPC ....... A47C 31/007; B08B 13/00; B08B 3/022; B08B 3/045; B08B 3/10; B08B 3/02; Y02B 40/00; A61L 2/04; A61L 2/07; A61L 2/10; A61L 2/183; A61L 2/202
See application file for complete search history.

(56) References Cited

FOREIGN PATENT DOCUMENTS

JP H08196774 A * 8/1996

OTHER PUBLICATIONS

Ota Moritaka Publication Aug. 6, 1996 retrieved translation from ESPACENET: https://worldwide.espacenet.com/patent/search/family/012181967/publication/JPH08196774A?q=JP%203734288%20B2 (Year: 1996).*

* cited by examiner

*Primary Examiner* — Monica S Carter
*Assistant Examiner* — Christopher Soto
(74) *Attorney, Agent, or Firm* — Wang Law Firm, Inc.

(57) ABSTRACT

A mattress cleaning machine, including a frame and a horizontal cylinder provided inside the frame. The inside of the horizontal cylinder is provided with a cuboid inner container, two ends of the cuboid inner container are rotatably mounted to the horizontal cylinder, one side of the cuboid inner container is successively formed from top to bottom with multiple loading cabins for placing multiple mattresses, the multiple loading cabins are jointly provided with an openable and closable cabin door at an entrance on the same side, and a sealing door is provided at a position on the upper part of one side of the horizontal cylinder. One end of the cuboid inner container is provided with a positioning device for positioning the cabin door to the position of the sealing door.

8 Claims, 5 Drawing Sheets

MATTRESS CLEANING MACHINE

TECHNICAL FIELD

The present invention relates to washing machines and more particularly to a mattress cleaning machine.

BACKGROUND

Mattress cleaning equipment has developed for many years. The conventional inner containers of the mattress cleaning machine are cylindrical-shaped, and due to the special structure of a mattress, the cylindrical inner container can not effectively clean the mattress. Therefore, an inner container with a special structure is required.

SUMMARY OF THE INVENTION

The object of the present invention is to provide a mattress cleaning machine that adopts a cuboid inner container for placing more mattresses, and during loading and unloading, the cabin door and sealing door can be maintained at a position convenient for loading and unloading.

In order to achieve the above object, an embodiment of the present invention discloses a mattress cleaning machine, comprising a frame and a horizontal cylinder provided inside the frame. The horizontal cylinder is provided with a cuboid inner container. Two ends of the cuboid inner container are rotatably mounted to the horizontal cylinder. One side of the cuboid inner container is successively formed from top to bottom with multiple cabins for placing multiple mattresses. The multiple cabins are jointly provided with an openable and closable cabin door at an entrance on a same side, and a sealing door is provided at a position on an upper part of one side of the horizontal cylinder. One end of the cuboid inner container is provided with a positioning device for positioning the cabin door to a position of the sealing door.

In a embodiment, one end of the cuboid inner container sealingly protrudes from the outer side of the horizontal cylinder and is coaxially formed with a positioning pole; the upper end and lower end of the positioning pole are respectively mounted with a positioning piece parallel to each other; telescopic cylinders are respectively provided below the positioning piece at two sides of an axial center of the positioning pole; when the two telescopic cylinders extend at the same time and bear against the same positioning piece, the cabin door reaches the position of the sealing door.

In a embodiment, the top of the telescopic cylinder is fitted to the positioning piece.

In a embodiment, a brake disc is coaxially fixedly mounted to a side of the positioning pole close to the horizontal cylinder, and one side of the brake disc is mounted with a brake device.

In a embodiment, the brake device comprises a driving disc that drives a clamping arm to clamp the brake disc.

In a embodiment, photoelectric sensors are mounted to two sides of the positioning pole respectively; a photoelectric reflecting plate is mounted to the brake disc, and when the photoelectric sensor receives a signal of the photoelectric reflecting plate, the telescopic cylinder starts to drive.

In a embodiment, the other side of the multiple cabins is provided with another cabin door.

In a embodiment, two cabin doors are respectively provided on the same side of the multiple cabins, and connecting ends of the two cabin doors on the same side are close to each other.

In a embodiment, another sealing door is provided on the upper part of the other side of the horizontal cylinder.

Compared with the prior art, the advantages of the present invention are that the cuboid inner contain is provided to adapt to the special structure of the mattress, and multiple mattresses can be cleaned at one time. The cabin door is provided on one side of the inner container to ensure that the mattress is always inside the inner container when the inner container rotates to carry out cleaning. Besides, due to the special inner container structure, the corresponding positioning structure is required to meet the requirement that the internal cabin door can be opened during loading and unloading, that is, at the beginning and end of the cleaning, the position of the cabin door is at the position of the sealing door, thereby ensuring that the cabin door can be opened and the mattress can be loaded and unloaded.

BRIEF DESCRIPTION OF THE DRAWINGS

In order to illustrate the embodiments of the present invention or the technical solutions in the prior art more clearly, the following will briefly introduce the drawings that need to be used in the description of the embodiments or the prior art. Obviously, the drawings in the following description are merely some embodiments recorded in the present invention. For those of ordinary skills in the art, other drawings can be obtained according to these drawings without involving inventive efforts.

DETAILED DESCRIPTION OF THE INVENTION

The technical solutions in the embodiments of the present invention will be described in detail below in conjunction with the accompanying drawings in the embodiments of the present invention. Obviously, the described embodiments are only a part of the embodiments of the present invention, rather than all the embodiments. Based on the embodiments of the present invention, all other embodiments obtained by one of ordinary skills in the art without involving any inventive effort are within the scope of the present invention.

Figure 1:
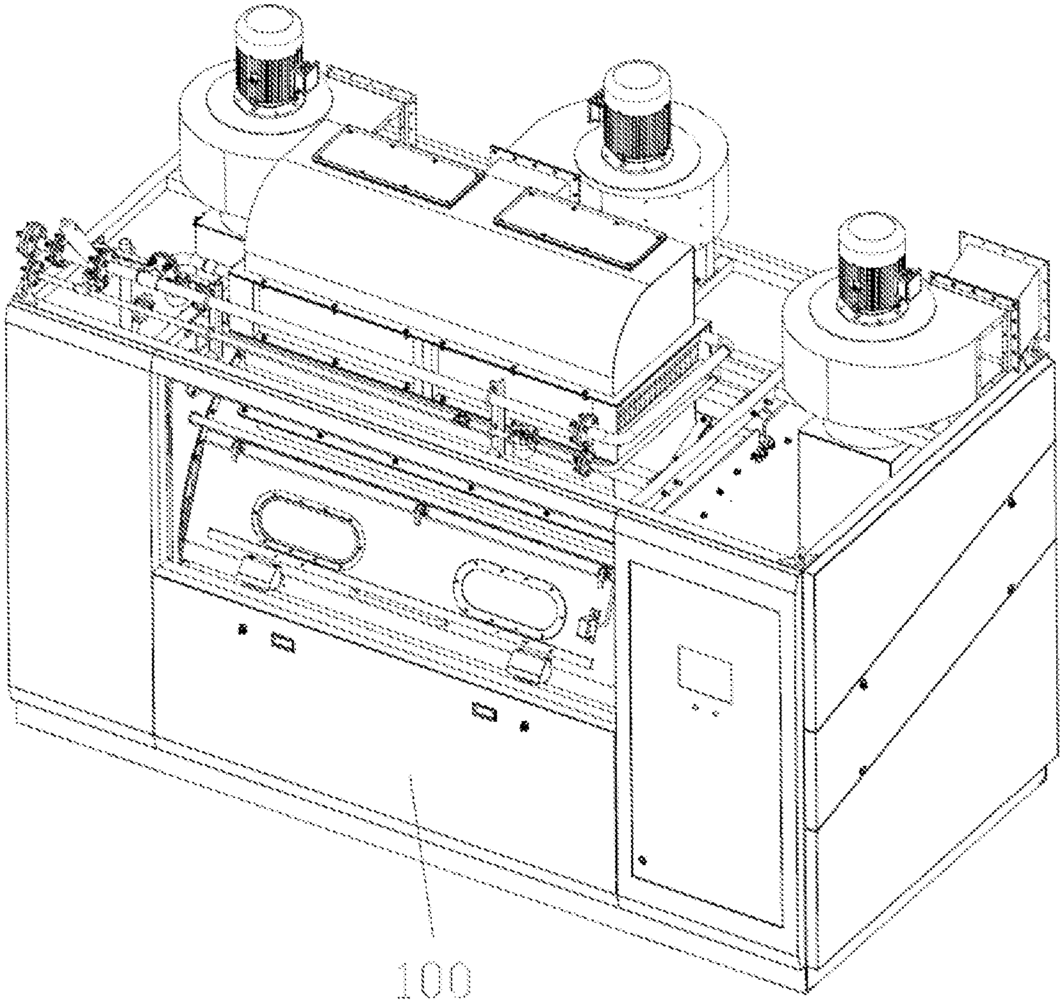
FIG. 1 is a perspective view of a mattress cleaning machine according to an embodiment of the present invention.
Figure 2:
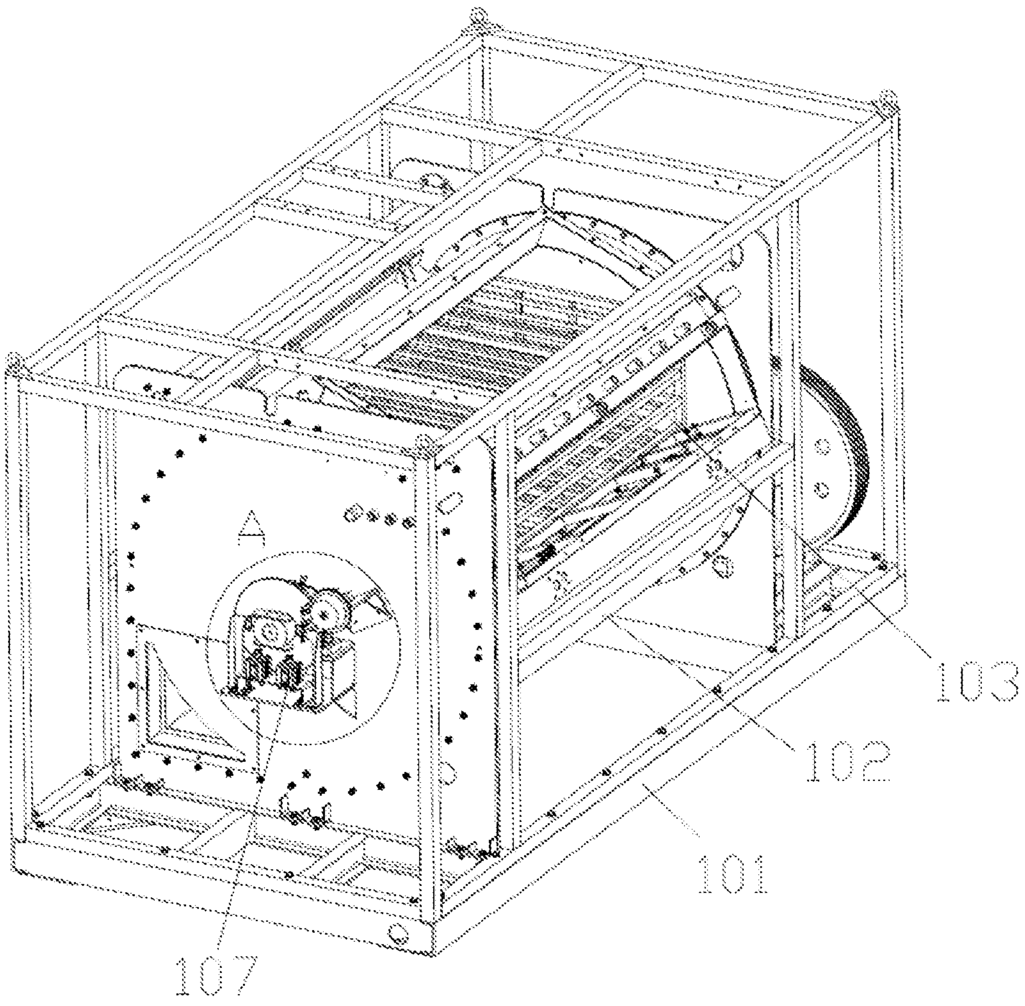
FIG. 2 is a frame diagram of a mattress cleaning machine according to an embodiment of the present invention.
Figure 3:
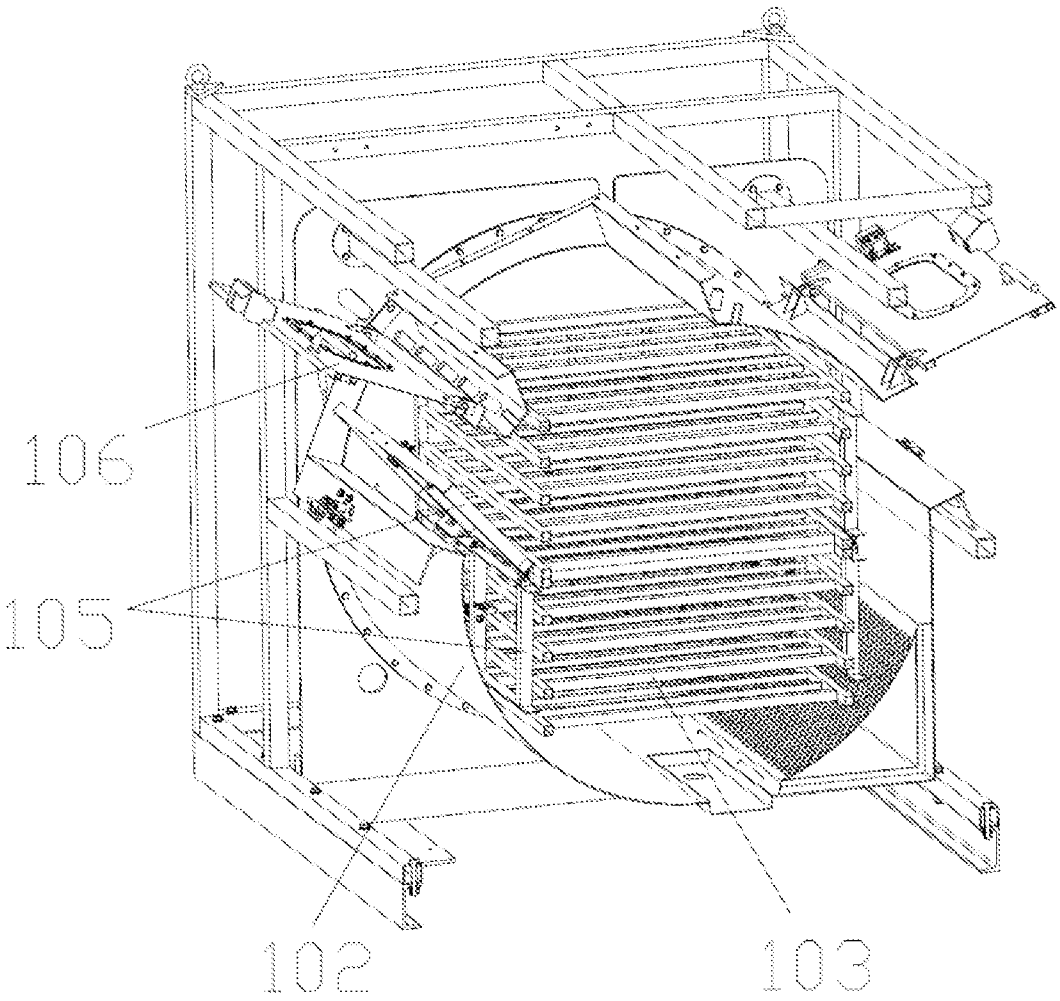
FIG. 3 is a sectional view of a mattress cleaning machine according to an embodiment of the present invention.
Figure 4:
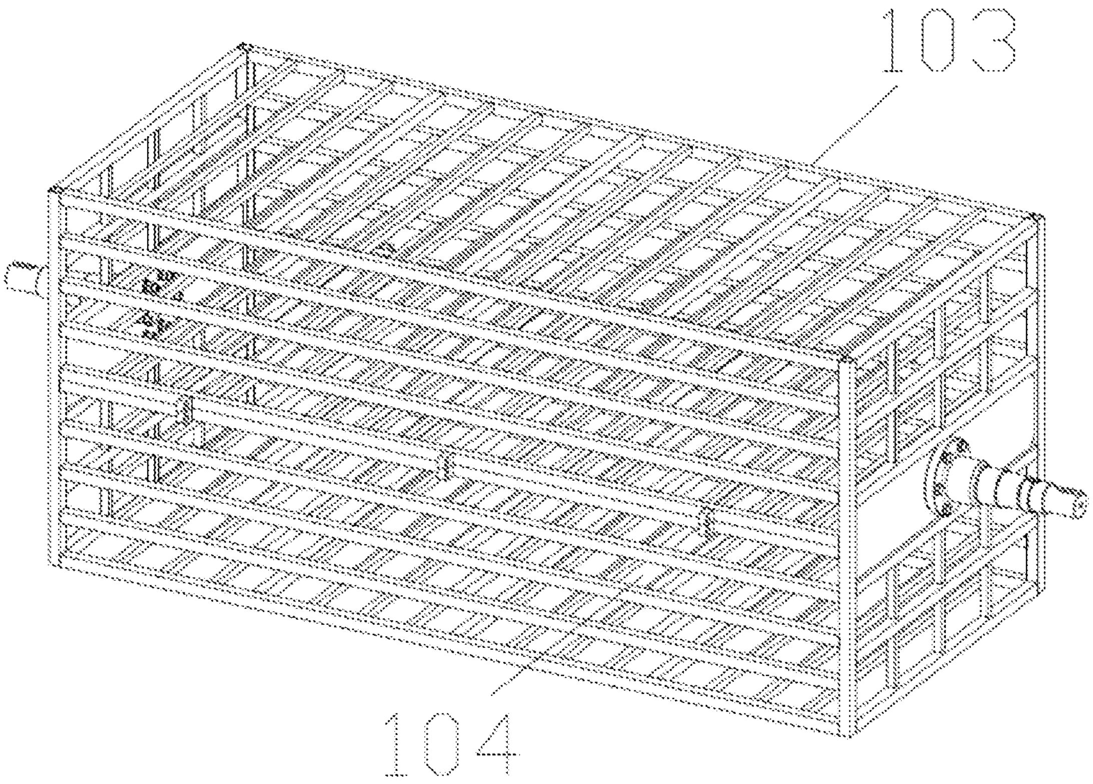
FIG. 4 is a perspective view of a cuboid inner container according to an embodiment of the present invention.
Figure 5:
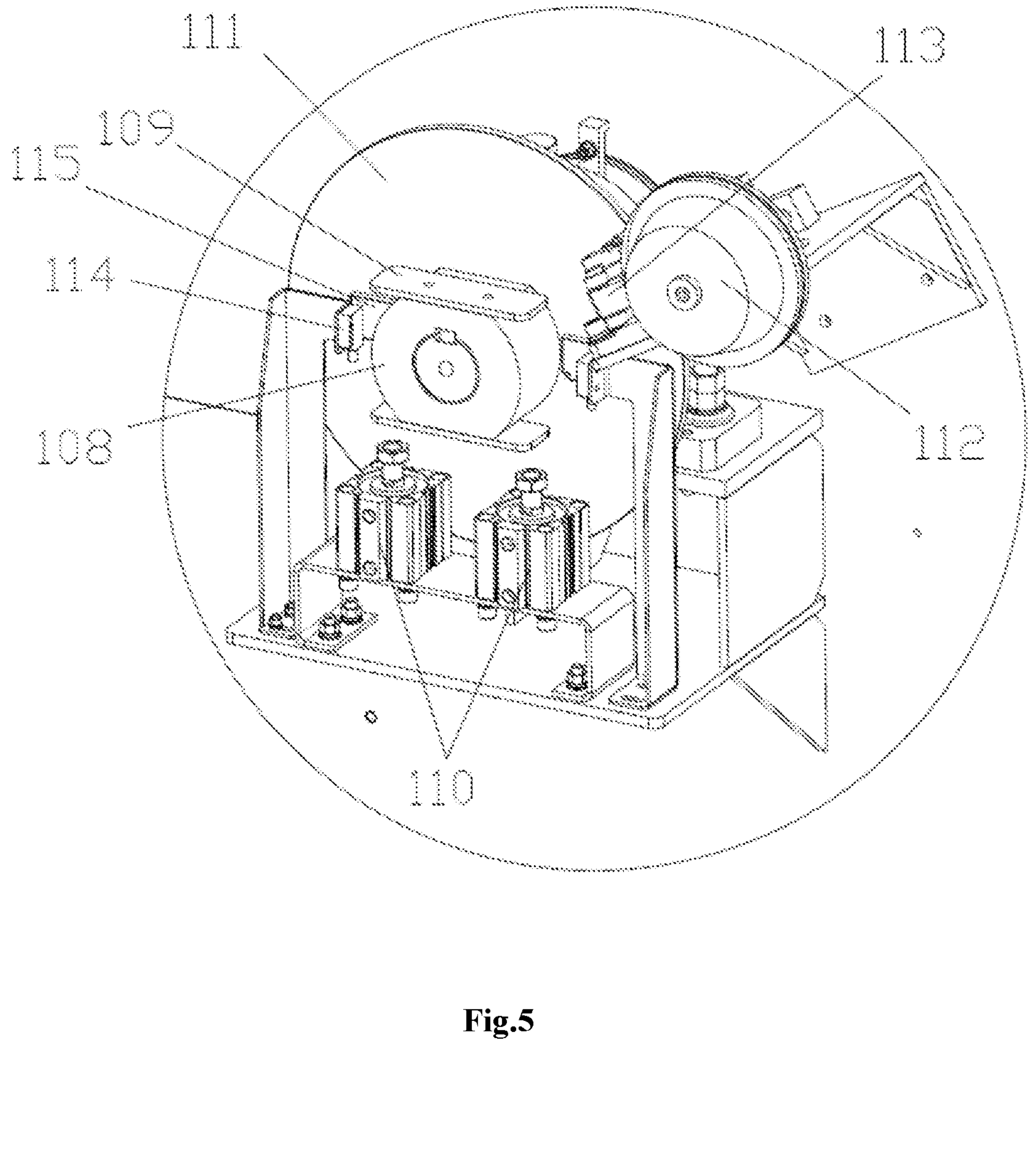
FIG. 5 is an enlarged view at A in FIG. 2.

With reference to FIGS. 1-5, a mattress cleaning machine 100 comprises a frame 101 and a horizontal cylinder 102 arranged inside the frame 101. The the horizontal cylinder 102 is provided with a cuboid inner container 103 therein. Two ends of the cuboid inner container 103 are rotatably mounted to the horizontal cylinder 102. One side of the cuboid inner container 103 is successively provided from top to bottom with multiple cabins 104 for placing multiple mattresses, the multiple cabins 104 are jointly provided with an openable and closable cabin door 105 at an entrance on the same side, and a sealing door 106 is provided at a position on the upper part of one side of the horizontal cylinder 102. One end of the cuboid inner container 103 is provided with a positioning device 107 for positioning the cabin door 105 to the position of the sealing door 106. One end of the cuboid inner container 103 sealingly protrudes from the outer side of the horizontal cylinder 102 and is coaxially formed with a positioning pole 108; the upper end and lower end of the positioning pole 108 are respectively mounted with a positioning piece 109 parallel to each other; telescopic cylinders 110 are respectively provided below the positioning piece 109 at two sides of the axial center of the positioning pole 108; when the two telescopic cylinders 110 extend at the same time and bear against the same positioning piece 109, the cabin door 105 reaches the position of the sealing door 106.

In an embodiment, by providing two telescopic cylinders at two sides of the axial center to lift up while placing against the positioning piece, it is ensured that the cuboid inner container is located at a special position, namely, at this moment, the cabin door is located at the sealing door, and at this moment, when the sealing is opened, the cabin door can be further opened for taking out or placing a mattress. A plurality of mattresses are placed in multiple cabins arranged successively from top to bottom. After the multiple mattresses are placed, the mattresses are isolated in each cabin after the cabin door is closed, and each mattress can be cleaned more sufficiently because the cuboid inner container rotates and sprays water during cleaning. The cuboid inner container can not only allow multiple mattresses to be placed, but also set the inner container structure according to the shape of the mattress, which can not only better carry the mattress, but also prevent the mattress from falling out and like problems when rotating and cleaning is performed.

Further, the top of the telescopic cylinder 110 is fitted to the positioning piece 109.

In this embodiment, it is ensured that it can be more stable when closing and opening, and loosening and like situations will be prevented.

Further, one side of the positioning pole 108 close to the horizontal cylinder 102 is coaxially fixedly mounted with a brake disc 111, and one side of the brake disc 111 is mounted with a brake device.

In this embodiment, since the rotation speed of the inner container is relatively high during cleaning, it is necessary to decelerate first when stopping. This technical solution adopts a common deceleration structure, does not define the specific structure of the brake device, and only needs a structure capable of decelerating, which all fall within the scope of the present invention.

Further, the brake device comprises a driving disc 112 which drives a clamping arm 113 to clamp the brake disc 111.

In this embodiment, the structure of using the driving disc to drive the clamping arm to clamp the brake disc is simple in structure, easy to implement, and easy to control.

Further, photoelectric sensors 114 are mounted to two sides of the positioning pole 108 respectively. A photoelectric reflecting plate 115 is mounted to the brake disc 111. When the photoelectric sensor 114 receives a signal of the photoelectric reflecting plate 115, the telescopic cylinder 110 starts to drive.

In this embodiment, since the speed is high at the time of braking, further operation of the positioning device is required when almost no movement or stop is required. If two positioning pieces are in the vertical position, it is almost impossible to perform positioning. Therefore, a photoelectric sensor is added, so that the driving of the telescopic cylinder is started when the positioning piece reaches an operable position, i.e. the structure of the photoelectric sensor and the photoelectric reflecting plate is used to position the operable position.

Further, another cabin door 105 is opened on the other side of the multiple loading cabins 104. Two cabin doors 105 are respectively opened on the same side of the multiple loading cabins 104, and the connecting ends of the two cabin doors 105 on the same side are close to each other. Another sealing door 106 is opened at a position on the upper part of the other side of the horizontal cylinder 102.

In this embodiment, the cuboid inner container may be provided in the form of four doors on two sides, or may be provided in the form of two doors on two sides, and one door may be provided with about four mattresses, surely other numbers of mattresses may also be provided. When doors are opened on two sides, it is also necessary to provide two sealing doors for opening and closing; that is to say, the present structure may be provided with the mode of "a mattress entering and exiting from the same end", or may be provided with the mode of "a mattress entering and exiting from different ends", which only needs to be set according to actual requirements.

However, the cuboid inner container can also be opened on the same side and on different sides. When the structure of doors on two sides is adopted, a double mode of "a mattress entering and exiting from the same end/different ends" can be realized at this moment; an increased number of mattresses can be achieved when four doors on two sides are used.

It needs to be noted that the relational terms such as the first and the second, and the like herein are merely intended to distinguish one entity or operation from another entity or operation without necessarily requiring or implying any actual such relationship or order between such entities or operations. Furthermore, the terms "comprises", "comprising", or any other variation thereof, are intended to cover a non-exclusive inclusion, such that a process, a method, an article, or equipment that comprises a list of elements not only includes those elements but also includes other elements not expressly listed or elements inherent to such process, method, article, or equipment. An element defined by the phrase "including one" does not, without more constraints, preclude the existence of additional identical elements in the process, method, article, or equipment that includes the element.

The foregoing are only specific implementation modes of the present invention. It should be noted that it will be apparent to those of ordinary skills in the art that several improvements and modifications can be further made without departing from the principle of the present invention, and such improvements and modifications should also be considered falling into the scope of the present invention.

What is claimed is:

1. A mattress cleaning machine, comprising a frame;

a horizontal cylinder provided inside the frame, wherein the horizontal cylinder is provided with a cuboid inner container therein, two ends of the cuboid inner container are rotatably mounted to the horizontal cylinder, one side of the cuboid inner container is successively formed from top to bottom with multiple cabins for placing multiple mattresses, the multiple cabins are jointly provided with an openable and closable cabin door at an entrance on a same side, and a sealing door is provided at a position on an upper part of one side of the horizontal cylinder; and a positioning device provided at one end of the cuboid inner container, the positioning device being designed for positioning the cabin door to a position of the sealing door; one end of the cuboid inner container sealingly protrudes from an outer side of the horizontal cylinder and is coaxially provided with a positioning pole; an upper end and a lower end of the positioning pole are respectively mounted with a positioning piece parallel to each other; two telescopic cylinders are respectively provided below the positioning piece at two sides of an axial center of the positioning pole; and when the two telescopic cylinders extend at the same time and bear against the same positioning piece, the cabin door reaches the position of the sealing door.

2. The mattress cleaning machine according to claim 1, wherein a top of the telescopic cylinder contacts the positioning piece.

3. The mattress cleaning machine according to claim 1, wherein a brake disc is coaxially fixedly mounted to a side of the positioning pole close to the horizontal cylinder, and one side of the brake disc is mounted with a brake device.

4. The mattress cleaning machine according to claim 3, wherein the brake device comprises a driving disc that drives a clamping arm to clamp the brake disc.

5. The mattress cleaning machine according to claim 3, wherein photoelectric sensors are mounted to two sides of the positioning pole respectively; a photoelectric reflecting plate is mounted to the brake disc, and when the photoelectric sensor receives a signal of the photoelectric reflecting plate, the telescopic cylinder starts to drive.

6. The mattress cleaning machine according to claim 1, wherein the other side of the multiple cabins is provided with another cabin door.

7. The mattress cleaning machine according to claim 6, wherein two cabin doors are respectively provided on the same side of the multiple cabins, and connecting ends of the two cabin doors on the same side are close to each other.

8. The mattress cleaning machine according to claim 6, wherein another sealing door is provided on an upper part of the other side of the horizontal cylinder.

* * * * *